(12) United States Patent
Diaz

(10) Patent No.: US 7,177,738 B2
(45) Date of Patent: Feb. 13, 2007

(54) VEHICLE MANAGEMENT SYSTEM

(75) Inventor: Melvin Diaz, La Palma, CA (US)

(73) Assignee: Alpine Electronics, Inc., Tokyo (JP)

( * ) Notice: Subject to any disclaimer, the term of this patent is extended or adjusted under 35 U.S.C. 154(b) by 1119 days.

(21) Appl. No.: 09/870,235

(22) Filed: May 30, 2001

(65) Prior Publication Data

US 2002/0184062 A1 Dec. 5, 2002

(51) Int. Cl.
G06F 19/00 (2006.01)
G06F 7/00 (2006.01)

(52) U.S. Cl. .............. 701/29; 701/32; 701/35

(58) Field of Classification Search ........ 705/6–8; 340/825.28, 901, 5.2; G06F 17/60
See application file for complete search history.

(56) References Cited

U.S. PATENT DOCUMENTS

| | | | |
|---|---|---|---|
| 4,398,172 A * | 8/1983 | Carroll et al. ........... 340/942 |
| 5,414,624 A | 5/1995 | Anthonyson | |
| 5,745,052 A | 4/1998 | Matsuyama et al. | |
| 5,940,481 A | 8/1999 | Zeitman | |
| 6,006,148 A | 12/1999 | Strong | |
| 6,069,588 A | 5/2000 | O'Neill, Jr. | |
| 6,102,285 A | 8/2000 | Elias | |
| 6,112,152 A | 8/2000 | Tuttle | |
| 6,141,610 A | 10/2000 | Rothert et al. | |
| 6,192,347 B1 * | 2/2001 | Graff ................. 705/36 R |
| 6,408,232 B1 * | 6/2002 | Cannon et al. ............ 701/29 |
| 6,735,630 B1 * | 5/2004 | Gelvin et al. ............ 709/224 |
| 6,825,209 B2 * | 11/2004 | Thomas et al. ........... 514/285 |
| 6,850,209 B2 * | 2/2005 | Mankins et al. .......... 345/1.3 |
| 2002/0003571 A1 * | 1/2002 | Schofield et al. ......... 348/148 |
| 2002/0120728 A1 * | 8/2002 | Braatz et al. ........... 709/223 |
| 2002/0184062 A1 * | 12/2002 | Diaz ......................... 705/7 |
| 2002/0186144 A1 * | 12/2002 | Meunier ............... 340/825.28 |

FOREIGN PATENT DOCUMENTS

GB 2268608 * 1/1994
WO WO 01/43104 * 6/2001

OTHER PUBLICATIONS

BestBuy advertisement on Jun. 11, 2005 for Motorola Bluetooth Hnds-Free Kit (HS820).*

* cited by examiner

Primary Examiner—Cuong Nguyen
(74) Attorney, Agent, or Firm—Muramatsu & Associates

(57) ABSTRACT

A vehicle management method and system is able to monitor and manage a fleet of vehicles with high efficiency and low cost. The management method includes the steps of providing a radio transmitter connected to a vehicle navigation system in each vehicle, providing a radio transmitter connected to a facility computer in a vehicle management facility, receiving information regarding use of a vehicle by the vehicle navigation system from the facility computer which is transmitted through the radio transmitters, monitoring usage of the vehicle and storing data thereof in a memory, and sending the stored data to the facility computer through the radio transmitters.

18 Claims, 5 Drawing Sheets

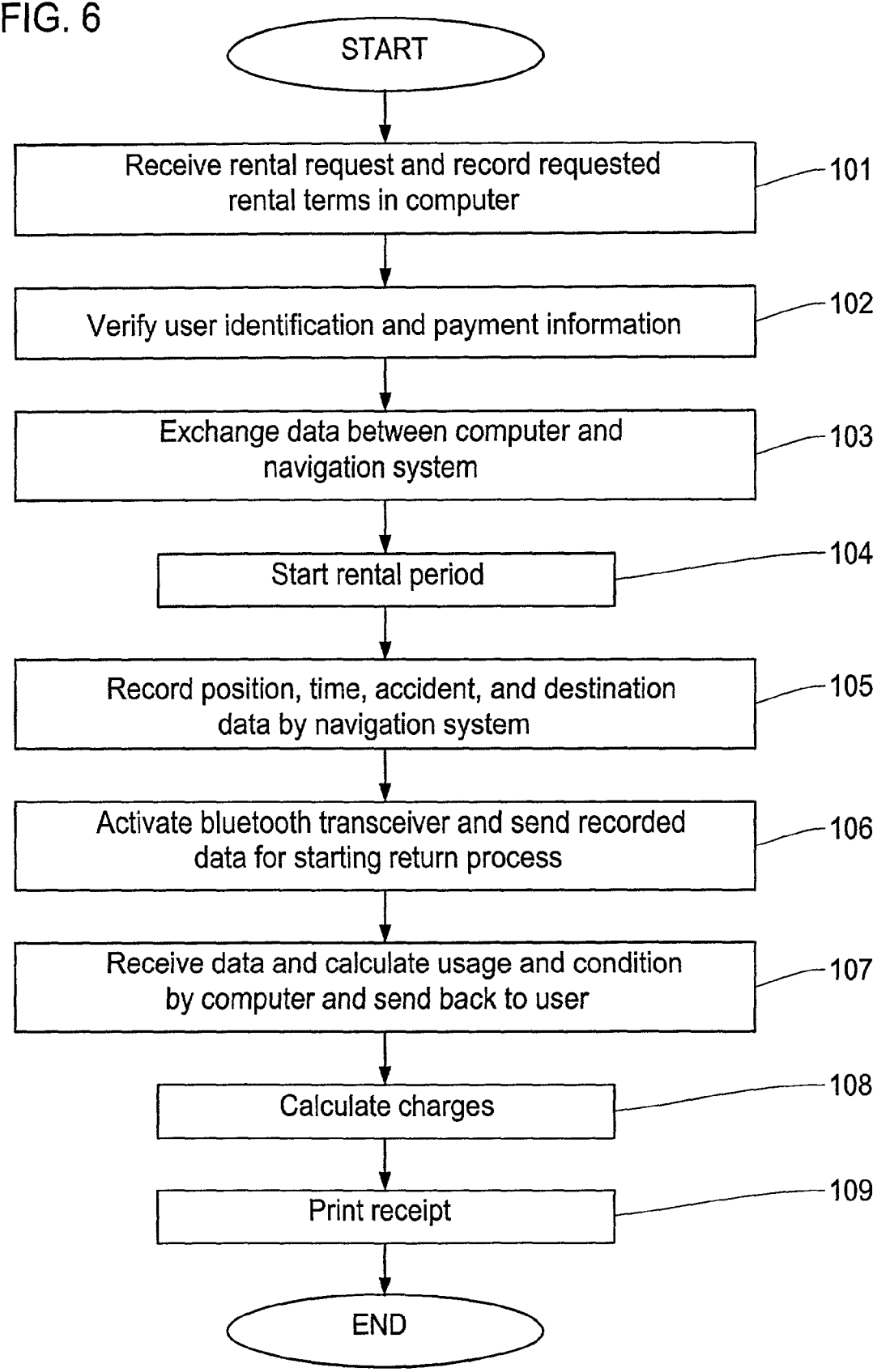

VEHICLE MANAGEMENT SYSTEM

FIELD OF THE INVENTION

This invention relates to a vehicle management system, and more particularly, to a vehicle data monitoring and management system to be used for vehicle fleet management in a rental car business and the like.

BACKGROUND OF THE INVENTION

In businesses involving a fleet of vehicles, there is a need to monitor and manage data concerning the usage and condition of each vehicle. One of the items that is commonly monitored is the distance or mileage that the vehicle has traveled. Depending on the purpose for which the vehicles is being used, the usage and condition of a vehicle is either recorded at fixed time intervals or is recorded after specific events. In a car rental business, for example, recordation of the condition and usage of a vehicle is made at the start and the end of the car rental. Other typical item to be monitored and recorded is an amount of gasoline used during the rent.

The process of monitoring such condition and usage of a vehicle is time consuming. Also, errors in recording the usage and condition of a vehicle are common. Typically, a user opens the vehicle, and looks at the odometer and fuel indicator to determine visually the indicated mileage and amount of gas used and writes the readings down on a paper. The mileage and amount of gas used are then typically entered manually into a computer. This process is repeated for each vehicle. Errors commonly occur from incorrectly reading the small numbers or indicator on the vehicle or from incorrectly writing down the numbers, or from incorrectly entering the numbers into the computer. Thus, the process for monitoring data of usage and condition is time consuming and expensive, particularly for businesses that maintain large fleets of vehicles. This is also time consuming for users or customers in renting and returning vehicles.

Although the present invention is described mainly with respect to a vehicle management system concerning the rental car facility, the application of the present invention is not limited to such a car rental business. The present invention is also applicable to taxi cab fleet management, delivery truck fleet management, and other vehicle fleet management industries.

As noted above, in the business involving a fleet of vehicles such as an automobile rental business, the mileage and gas usage must be monitored and recorded every time when the car is rented and returned. Other items that relate to the condition of the vehicle that must be monitored includes the fluid levels (engine oil, brake oil, coolant, etc.) of a vehicle, whether the vehicle is operating properly, whether the vehicle has been damaged in a collision, and whether the vehicle requires service.

Typically, each time a vehicle is rented, the automotive rental facility must ascertain the mileage of the vehicle and the amount of gas in the vehicle. In addition, once the vehicle is returned, the automotive rental facility must again determine the mileage of the vehicle, the amount of gas in the vehicle, and whether the vehicle is operating properly. The vehicle is also inspected for damage due to collision. This inspection typically involves visually inspecting the exterior of the vehicle by a rental facility personnel, which also involves human errors such as overlooking the small damages.

Once the required information is determined, it is entered into a computer. The computer subtracts the mileage of the vehicle when it was rented from the mileage of the vehicle after the vehicle is returned to determine the distance traveled during the rental. Similarly, the amount of gas in the vehicle when the vehicle was rented is subtracted from the amount of gas in the vehicle when the vehicle is returned to determine the amount of gas used. The user is typically charged on the basis of the period of time that the vehicle was rented, the number of miles traveled, and the amount of gas used. An invoice is then printed. The foregoing process of obtaining the required information is time consuming and expensive. In addition, the renter must wait while the required information is being gathered, entered into the computer, and processed.

Typically, the vehicle is again inspected as it is being cleaned and is checked to assure that it is operating properly. This check typically consists of verifying that fluid levels of oil, brake fluid, transmission fluid, coolant, etc. are within acceptable ranges. Typically, the vehicle is run for a short time to verify that the vehicle is operating properly. This inspection process is also time consuming and expensive.

Thus, there is a need of a new and efficient way to easily obtain information on the condition and usage of a vehicle. More particularly, a method and apparatus is needed for easily and cost effectively obtaining accurate information pertaining to the usage and condition of a vehicle.

SUMMARY OF THE INVENTION

It is, therefore, an object of the present invention to provide a vehicle management method and system which is capable of easily obtaining information on the condition and usage of a vehicle, thereby managing the fleet of vehicles with high efficiency and low cost.

It is another object of the present invention to provide a vehicle management method and system which is capable of easily and quickly conducting a check-out and return process involved in a rental car business.

It is a further object of the present invention to provide a vehicle management method and system which facilitates communication between a computer in a rental car facility and a navigation system in a rental vehicle through wireless communication means such as Bluetooth transceivers.

In the present invention, the vehicle management method and system includes a vehicle navigation system and a radio transmitter such as a Bluetooth transceiver provided in each vehicle, and a radio transmitter connected to a vehicle management facility computer. The vehicle management method and system of the present invention is capable of monitoring and managing the fleet of vehicles with high efficiency and low cost. The vehicle management method includes the steps of providing a radio transmitter connected to a vehicle navigation system in each vehicle, providing a radio transmitter connected to a facility computer in a vehicle management facility, receiving information regarding use of a vehicle by the vehicle navigation system from the facility computer which is transmitted through the radio transmitters, monitoring usage of the vehicle and storing data thereof in a memory, and sending the stored data to the facility computer through the radio transmitters.

BRIEF DESCRIPTION OF THE DRAWINGS

FIG. 6 is a flow chart showing an example of vehicle rental process in the vehicle management system of the present invention.

DETAILED DESCRIPTION OF THE PREFERRED EMBODIMENTS

The vehicle management system will be described in more detail with reference to the accompanying drawings. While the invention will be described in conjunction with the application of rental car management, it will be understood that the present invention is not limited to such a specific application.

Figure 1:
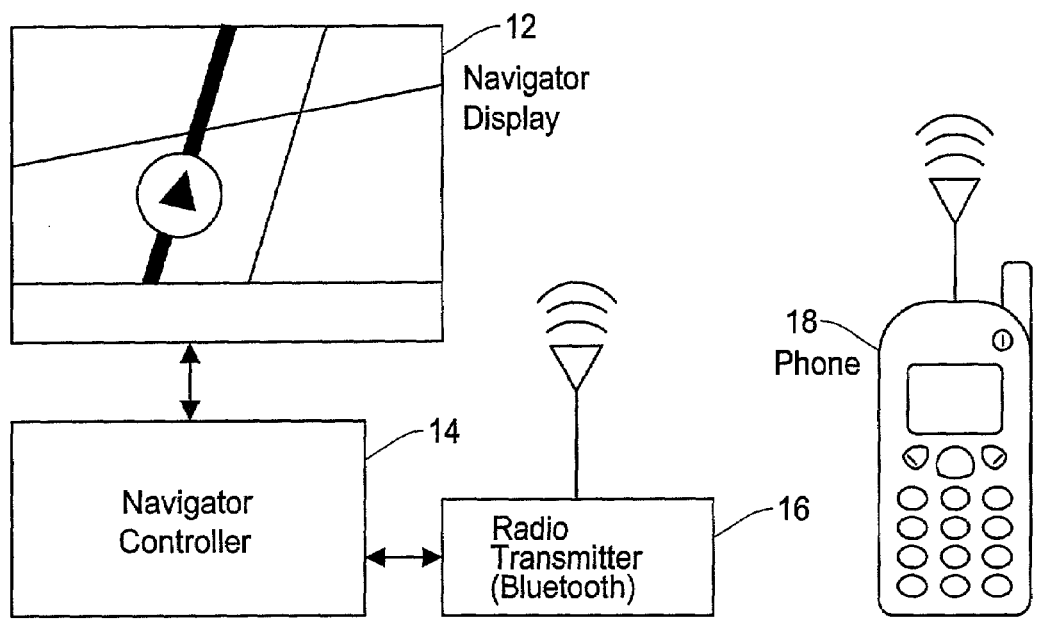
FIG. 1 is a schematic diagram showing a basic configuration of an apparatus to be installed in each vehicle in the vehicle management system of the present invention.
Figure 2:
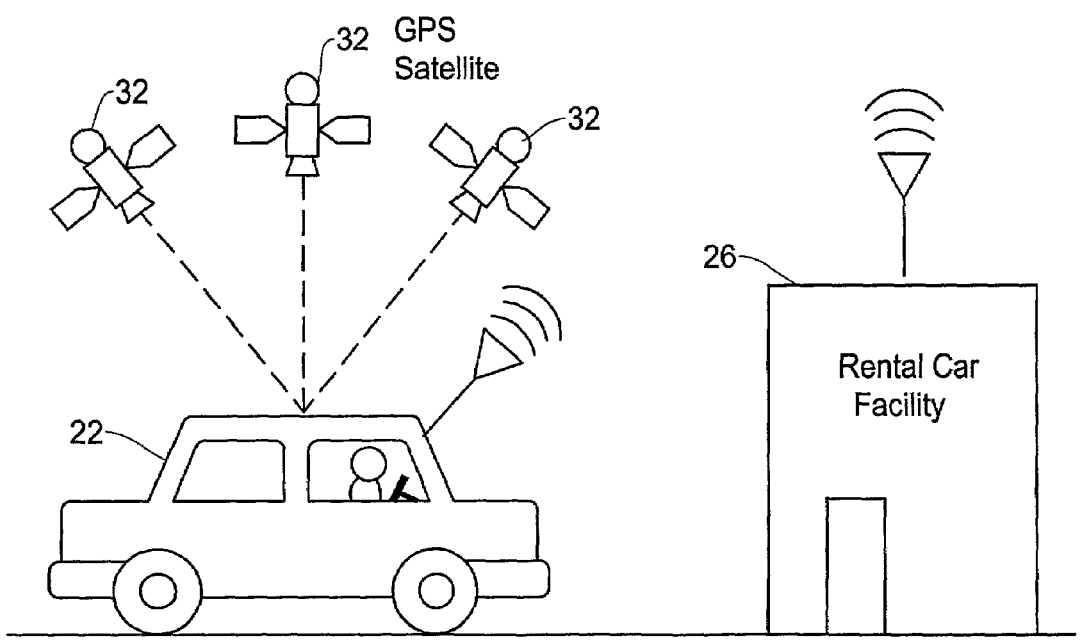
FIG. 2 is a schematic diagram showing a basic concept of the vehicle management system of the present invention involving a vehicle navigation system and a radio communication system.

FIGS. 1 and 2 schematically show basic concept of the apparatus installed in each vehicle in the vehicle management system of the present invention. In the present invention, each vehicle is provided with a navigation system with a Bluetooth transceiver or other RF wireless communication method as an embedded or peripheral device. Each vehicle may also be provided with optional hardwired data bus connection for vehicle diagnostics information such as for sensing vehicle speed, engine speed, fluid levels, distance traveled, air bag deployment, engine trouble codes, etc. Preferably, the vehicle user may carry a Bluetooth or other wireless standards compatible cellular phone.

In the application of rental car management, a rental car facility may include a computer system for collection of general information such as customer profile, vehicle information, rental terms, payment information, etc. Further, the rental car facility includes a radio transmitter such as a Bluetooth transceiver connected to the computer system for communication of general information with the rental car equipped with navigation system with the radio transmitter 16 such as a Bluetooth transceiver.

In the example of FIG. 1, the navigation system includes a navigator display 12 and a navigator controller 14. A radio transmitter 16, preferably, a Bluetooth transmitter (transceiver) or an IEEE 802.11b wireless LAN transmitter, or a HomeRF transmitter is connected to the navigation system. FIG. 1 also shows a cellular phone 18 owned by the user or rental facility which preferably be configured to be compatible with the Bluetooth or other radio communication protocol noted above. As is well known in the art, the navigator display 12 shows a locator map display indicating a map image and a current vehicle position or a route guidance display indicating an intersection and a direction to turn for guiding the driver to the destination.

Here, Bluetooth technology provides a universal radio interface in the 2.45 GHz frequency band that enables portable electronic devices to connect and communicate wirelessly via short-range ad hoc networks. The Bluetooth technology is described in Haarstsen "Bluetooth—The Universal Radio Interface for Ad Hoc, Wireless Connectivity", Ericsson Review No. 3, 1998, pp. 110–117, and also in "www.bluetooth.com" the disclosures of which are hereby incorporated by reference.

Another example of such a wireless communication method is IEEE 802.11b (also known as "Wi-Fi" or "wireless ethernet") standard. This method has a speed of 11 Megabyte per second with a frequency sharing of direct sequence spread spectrum method. The details of this standard are described in "www.wirelessethernet.com", the disclosure of which is hereby incorporated by reference. A further example is a HomeRF standard. This method has a speed of 1, 2 or 10 Megabyte per second with a frequency sharing of wideband frequency hopping method. The details are described in "www.homerf.org", the disclosure of which is incorporated by reference.

As shown in FIG. 2, the navigation system is capable of determining the current vehicle position with use of GPS (Global Positioning System) satellites 32. Thus, when the vehicle is approaching the rental car facility 26 for returning the vehicle, for example, the navigation system is able to detect whether the vehicle is within a predetermined distance from the rental car facility 26. When the vehicle is in the predetermined distance, the navigation system instructs the radio transmitter (Bluetooth transceiver) 16 to send a signal to the radio transmitter in the rental car facility 26, thereby starting the communication between the rental car and the rental car facility.

Figure 3:
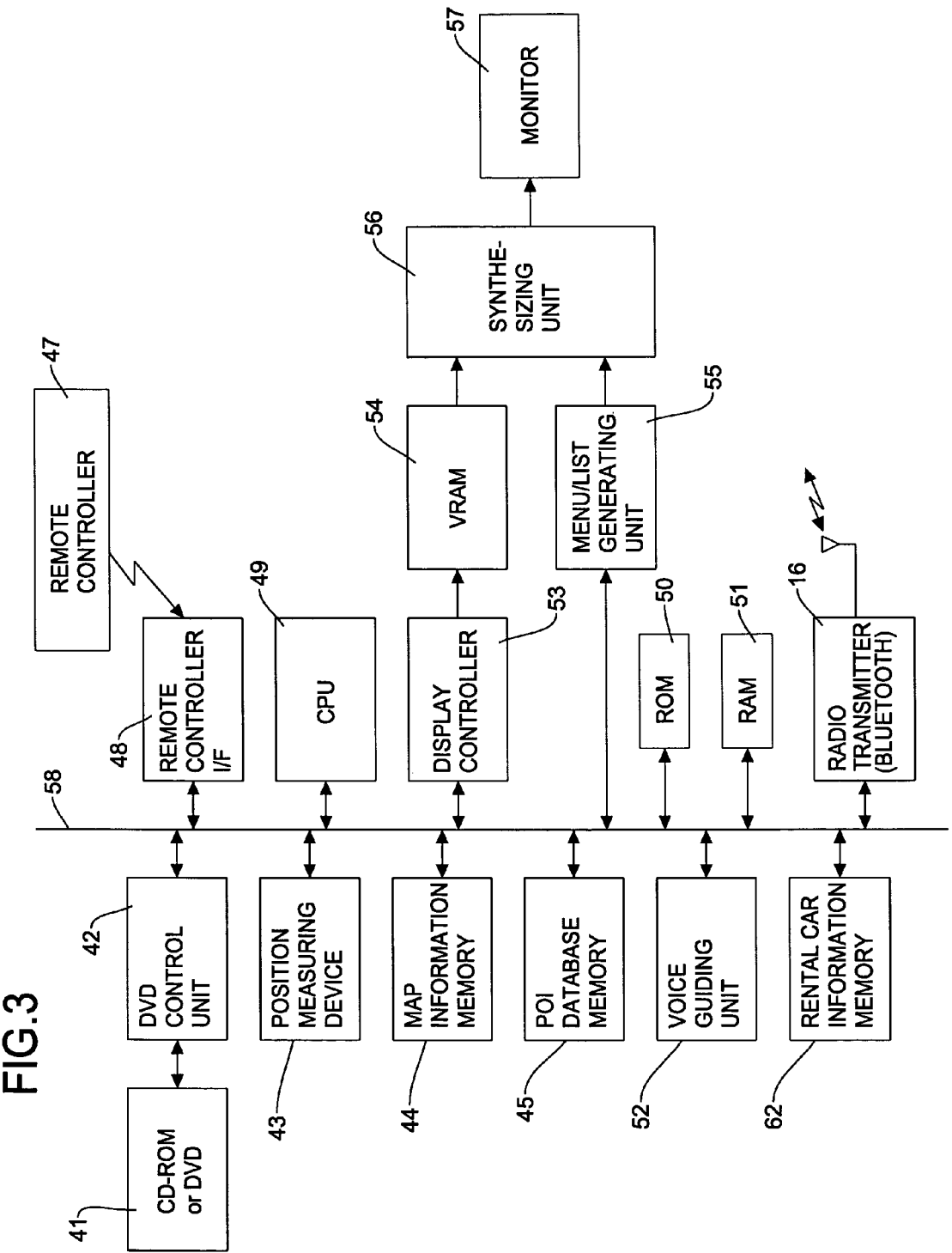
FIG. 3 is a block diagram showing a structure of a vehicle navigation system which additionally includes a rental car management function and a radio transmission function.

FIG. 3 shows an example of structure in the navigation system including the vehicle management function of the present invention. In the block diagram of FIG. 3, the navigation system includes a map storage medium 41 such as a CD-ROM or DVD (hereafter "DVD") for storing map information, a DVD control unit 42 for controlling an operation for reading the map information from the DVD, a position measuring device 43 for measuring the present vehicle position which has a vehicle speed sensor for detecting a moving distance, a gyroscope for detecting a moving direction, a microprocessor for calculating a position, a GPS receiver, and etc.

The navigation system includes a map information memory 44 for storing the map information which is read out from the DVD 41, a database memory 45 for storing database information such as point of interest (POI) information which is read out from the DVD 41. The navigation system includes a remote controller 47 for executing a menu selection operation, an enlarge/reduce operation, a destination input operation, etc. and a remote controller interface 48.

The navigation system further includes a processor (CPU) 49 for controlling an overall operation of the navigation system, a ROM 50 for storing various control programs such as a route search program and a map matching program necessary for navigation control, a RAM 51 for storing a processing result such as a guide route, a voice guiding unit 52 for guiding a traveling direction at a crossroad with spoken instructions, a display controller 53 for generating map images (a map guide image and an arrow guide image) on the basis of the map information, a VRAM 54 for storing the images generated by the display controller, a menu/list generating unit 55 for generating menu image/various list images, a synthesizing unit 56 for synthesizing images from the VRAM 54 and the menu/list generating unit 55, a monitor (display) 57, and a bus 58 for interfacing the above units in the system.

The navigation system further includes a rental car information memory 62 for storing information related to the rental vehicle management, a radio transmitter 16 which is typically a short-range wireless transceiver, preferably a Bluetooth transceiver or other wireless transmitter and means (not shown) for receiving signals from various sensors in the vehicle for monitoring the vehicle parameters including mileage, gas levels, oil levels, etc. Preferably, the vehicle further includes an air bag sensor or a shock sensor to detect an accident encountered by the rental vehicle.

Figure 4A:
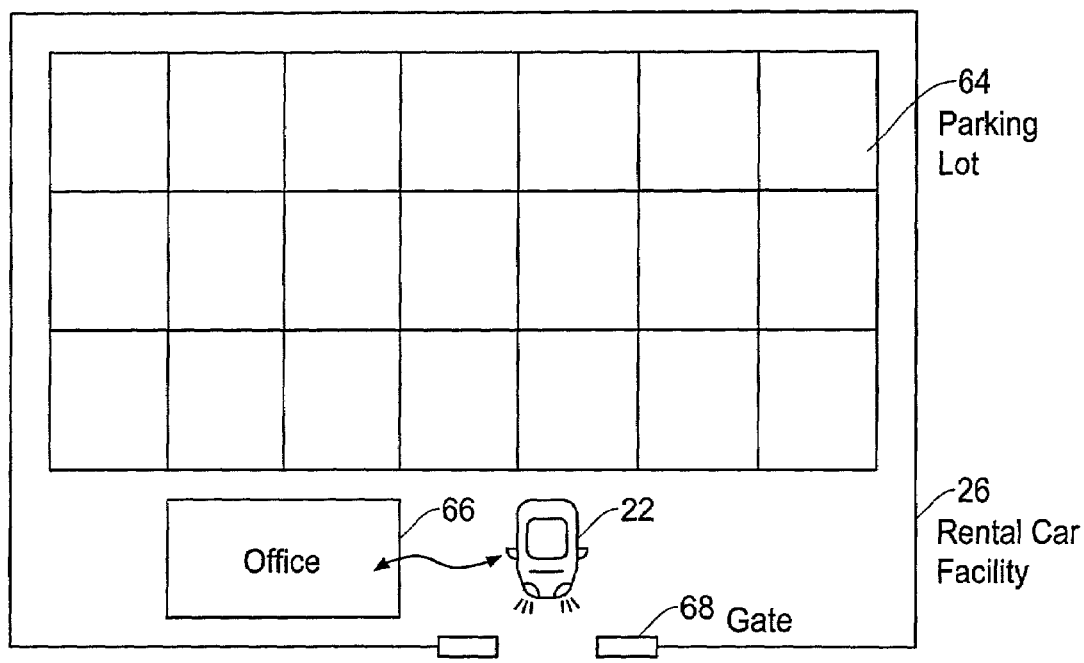
FIG. 4A is a schematic diagram showing an example of structure involving a rental vehicle facility using the vehicle management system of the present invention.
Figure 4B:
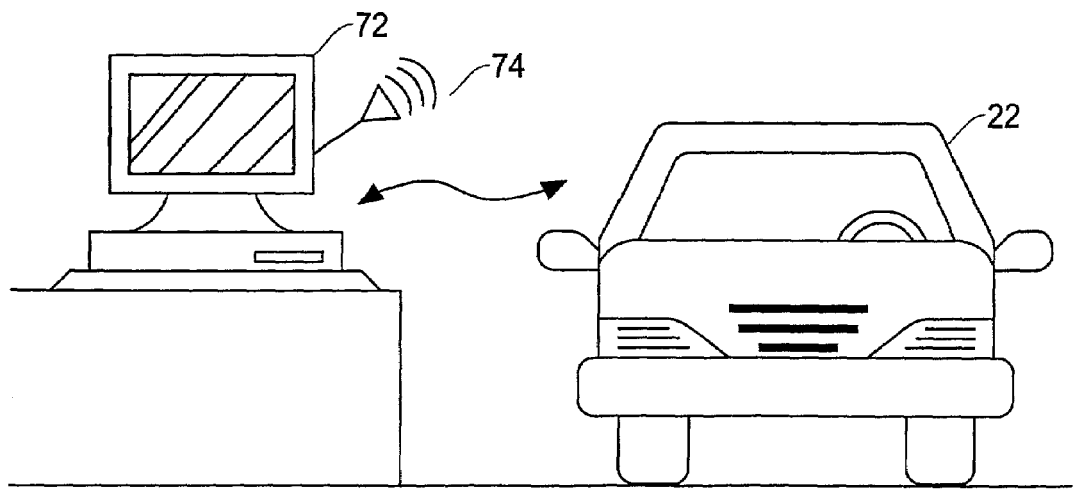
FIG. 4B is a schematic diagram showing an example of communication between the gate of the rental facility and the rental car.

Based on the structure of the present invention described above, the method of managing the vehicle fleet data is described below. An example of process for checking out the vehicle from the rental facility is shown in FIGS. 4A and 4B. A user (customer) makes a reservation for a rental car through any traditional means such as through Internet, phone call, travel agent, walk-in, etc. The rental terms and user information are collected and stored in a computer database in an office 66 of the rental car facility 26 shown in FIGS. 4A and 4B.

The rental car facility 26 is equipped with a radio transmitter such as a Bluetooth transceiver 74 or a radio transmitter based on the wireless communication method noted above. The Bluetooth transceiver 74 is connected to the computer 72. The Bluetooth transceiver 74 is a short-range wireless transceiver which has a covering range of 100 meters, for example, thereby enabling to communicate any vehicles in the parking lot 64 of the rental car facility 26. Thus, the computer 72 may send the rental terms and user profiles to the appointed car in the parking lot 64 before the user coming.

The user arrives at the rental car facility 26 and the identification is verified via traditional means such as by a driver's license, credit card and/or membership card, etc. The user receives the vehicle in, for example, either standard service or enhanced service. In the standard service, the user is given the parking location coordinates of the vehicle and walks to the location of the parking lot 64 where the vehicle 22 waits. The user drives the vehicle 22 to a check-out gate 68 for final cross reference identification and check-out. In the enhanced service, a rental facility personnel delivers the vehicle to the customer at a pre-determined pickup point.

With the vehicle driven to the check-out gate 68, a check-out personnel activates wireless transfer of information between the vehicle 22 and rental facility computer 72 via the Bluetooth transceivers. RF communication between the rental facility computer 72 and the vehicle 22 exchanges, among others, the following types of information:

(1) Customer information including name, company, address, phone numbers, emergency contact information, (2) rental term information including rental location, rental date, return date, rate plan, insurance options, (3) vehicle make, model, year, license information, optional equipment such as navigation, cellular phone, telematics, etc., current mileage on vehicle, current fuel level on vehicle, other vehicle diagnostics information such as fluid levels of brake oil, engine oil, transmission oil, and coolant, (4) payment information including credit card number, authorization information, expiration date, and (5) other information as needed by the rental car facility or as requested by the customer such as destination address, today's plan, special POI (point of interest), etc.

After the verification and data transmission process is completed at the check-out gate 68, a check-out signal may be exchanged between vehicle and the rental facility to define the rental start time. The user drives the vehicle 22 to his destination. During the rental period, if the user wants to change the rental term such as the return date, he may call the rental facility 26 via the cellular phone. The modified rental term is stored in the rental facility computer 72. In the case where the cellular phone is Bluetooth enabled, the modified rental term may be automatically stored in the rental facility computer 72 and the rental car information memory 62 in the navigation system.

While driving the rental vehicle, if the vehicle is damaged by a collision, for example, the vehicle navigation system can store information regarding an accident event. If the damage is significant, for example, causing deployment of the vehicle safety air bags, the navigation system determines this from a signal from the air bag sensor or the shock sensor. Thus, the navigation system automatically stores this event information in the rental car information memory 62 (FIG. 3) in the navigation system.

Because the navigation system has a GPS receiver, it can store the time, date and location (coordinates, current street, city, etc.) of the accident event. Also, the navigation system can store origin and destination data input by the user prior to the accident. The navigation system further stores the information concerning the direction (north, south, etc.) of the vehicle immediately before the accident. If the accident is a major one, the user may be incoherent. Therefore, the accident event information stored in the navigation system contains information beneficial to all parties such as the rental car company, insurance companies, police, and all parties involved in the accident.

If the damage is not significant, for example, not causing deployment of the vehicle safety air bags, and the user is coherent, he/she can contact the rental car facility on further instructions on reporting the accident. The rental car facility can dictate that the user simply check an option in the navigation system to indicate that the car has been damaged (insignificantly) however requires attention once the vehicle is returned.

If, during the rental period, the vehicle is subject to theft or vandalism, a menu option in the navigation system can store information about the theft or vandalism so that it can be automatically reported via Bluetooth transceiver once the vehicle is returned to the rental car facility.

If, during the rental period, the driver is caught because of a parking and/or traffic violation, a menu option in the navigation system can be selected to store information about the parking and/or traffic violation so that it can be automatically reported via the Bluetooth transceiver once the vehicle is returned to the rental car facility.

If infrastructure allows, and the customer owns or is using a Bluetooth enabled phone as noted above, he/she can contact the rental facility. Thus, the rental facility can automatically download and upload information to and from the vehicle navigation system Bluetooth transceiver to update or change the information as needed. This applies to the information involved in the accident, theft or vandalism and parking and/or traffic violation.

Further, the communication through the Bluetooth enabled phone with the rental facility promotes the information transfer in such situations as follows: (1) If the original customer wants to add a driver (additional authorized operator) to the rental contract, he/she may do so via the Bluetooth enabled phone, (2) if the customer wishes to extend or shorten the rental period term, he/she may do so via the Bluetooth enabled phone, and (3) if the customer wants to change the rental return location, he/she may do so via the Bluetooth enabled phone.

When returning the vehicle, the user drives the car to the rental car facility. Since the navigation system can calculate proximity of the rental car facility from the current vehicle position, it can determine when to "turn on" the Bluetooth transceiver 16. Once the vehicle is within a predetermined distance (wireless communication range) from the rental car facility's Bluetooth transceiver(s), a Bluetooth device discovery process starts.

The Bluetooth discovery process ensues and collects all pertinent information such as the customer information, rental term information, vehicle information, usage and condition information, payment information, and other information. Such information is stored in the computer in the rental car facility. A return signal may be exchanged between the vehicle and the rental facility to define the rental stop time. The user proceeds into the rental facility check-in lanes and payment transactions are conducted automatically based on the stored information in the navigation system.

During the rental period, if the vehicle incurs an accident and damage, theft and/or vandalism, a parking and/or traffic violation, rental facility personnel are notified by the computer which stores such accident information received through the Bluetooth transceivers. The rental facility personnel will assist the customer in evaluating such incidents to determine whether further actions (damage assessment, payment of fines, etc.) are required by the customer.

To conduct the payment transactions above, the data relating to the usage and condition of the rental vehicle is processed by the computer. For example, the distance traveled by the vehicle between the rental start time (check-out) and the rental stop time (car return) is calculated. Also, the amount of gas used during the particular rental is determined by the difference of gas levels between the rental start time and the rental stop time. Further, any damages in the vehicle will be examined by rental facility personnel. Based on the usage and condition and damages, the rental facility computer determines the amount of payment, which is transmitted to the vehicle navigation system through the Bluetooth transceiver.

If a paper proof of the rental transaction is required, the user can pre-select to do so by requesting the paper proof through the navigation system's menu selections. The rental facility personnel can print out or the computer automatically prints out a receipt of transaction and delivers it to the user once he/she arrives.

Once the rental facility reclaims the vehicle from the renter, the rental facility maintenance personnel may prepare the vehicle for the next renting driver (wash vehicle, re-fill with gasoline, clear navigation system memory, etc.). In order to expedite delivery of the vehicle to the next driver, the location (location coordinates as determined by the navigation system GPS receiver are cross-referenced with the facility's parking location coordinates) of the parked vehicle is delivered to the facility. This is done by the rental facility vehicle maintenance personnel or automatically through the Bluetooth transceivers to the rental facility computer for easy location of the vehicle.

Figure 5A:
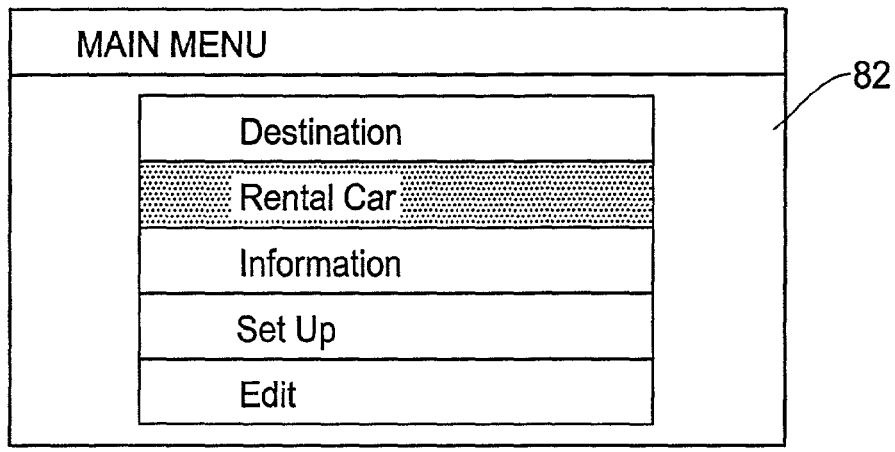
FIGS. 5A–5C are schematic diagrams showing display examples of vehicle navigation system including the rental car management function in accordance with the present invention.
Figure 5B:
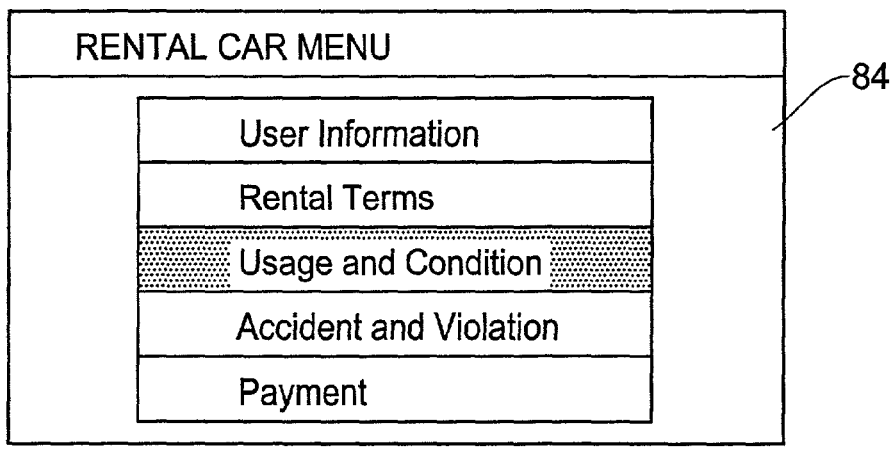
Figure 5C:
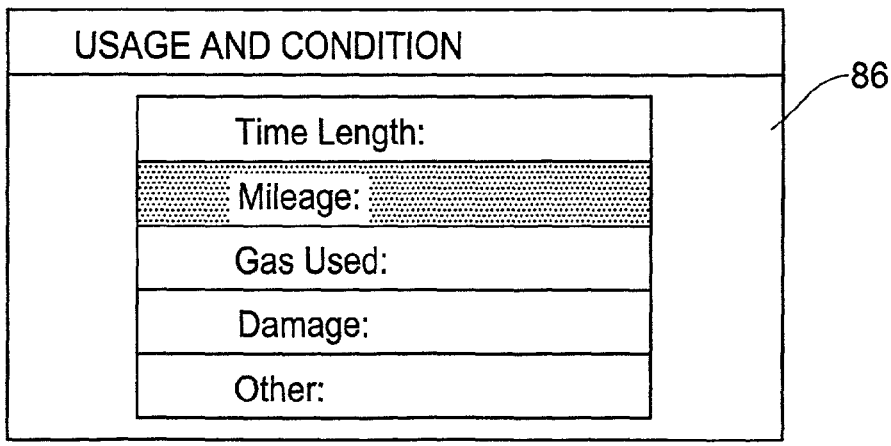

FIGS. 5A–5C show display examples of menus in the vehicle navigation system including the rental car management function of the present invention. These are merely examples for an illustration purpose only. FIG. 5A shows an example of main menu 82 which includes menu items of "Destination", "Rental Car", "Information", "Set Up" and "Edit". Most of the items are well known and commonly used in car navigation systems, however, the menu item "Rental Car" is unique to the navigation system of the present invention.

When the user selects the "Rental Car" menu, a rental car process described above starts, thereby showing a break down menu 84 of FIG. 5B. In the example of FIG. 5B, the rental car menu includes menu items of "User Information", "Rental Term", "Usage and Condition", "Accident and Violation", and "Payment".

The "User Information" menu is provided for entering and confirming the information regarding the user such as name, address, phone number, credit card information and the like. The "Rental Term" menu is provided for entering, modifying and confirming various conditions for car rental such as a rental time length, type of car to rent, rental rate and the like. The "Usage and Condition" menu is provided for confirming data involved in using the car during the rental such as mileage, amount of gas used, damages and the like. The "Accident and Violation" menu is provided for recording and confirming data involving an accident event, theft, traffic violation and the like. The "Payment" menu is provided for finalizing the rental process by confirming the amount of charges and method of payment and authorizing the payment by the user.

If the user selects the "Usage and Condition" menu when returning the car, for example, the navigation system moves to a "Usage and Condition" screen 86 such as shown in FIG. 5C. In the example of FIG. 5C, the navigation system displays the data concerning the usage and condition of the car resulted from the usage during the rental by the user. Typically, such data is made based on the information from the navigation system through the Bluetooth transceiver 16 and calculated by the rental facility computer 72. The computer sends the calculated data to the navigation system through the Bluetooth transceivers for confirmation by the user in the screen 86. In this example, the "Usage and Condition" screen 86 shows the time length of the rental, distance traveled by the rental car, the amount of gasoline used during the rental, damages of the car and the like.

FIG. 6 is a flow chart showing an example of vehicle rental process in the vehicle management system of the present invention. At step 101, the vehicle management system receives rental request by a user including user information, rental terms such as a rental time period, type of car, rate, and the like, which are recorded in the rental facility computer. When the user comes to the rental facility, the user information, payment condition, and rental term are confirmed in step 102. Through the Bluetooth transceivers, the rental facility computer and the navigation system in the rental car exchange data at the check-out gate, for example. The rental facility computer sends the data including the rental term, user information and the like while the navigation system sends the data including the current odometer reading, fluid levels and the like.

After exchanging the data in step 103, the rental starts at step 104 by, for example sending a rental start signal to the navigation system. During the rental, in step 105, the navigation system in the rental car monitors and records the condition and usage of the car including vehicle position, direction, time and destination. The navigation system automatically records an accident in such a case when a signal is received from the shock sensor or air bag sensor provided in the car.

At the end of the rental, the user drives the car to the rental facility. When the car reaches a range where the Bluetooth communication is possible, at step 106, the navigation system instructs the Bluetooth transceiver to send the data such as the usage and condition data to the rental facility computer. In step 107, the rental facility computer receives the data from the rental car and calculates the data to finalize the rental procedure. The rental facility computer sends the calculated data to the navigation system to be confirmed by the user. The rental facility computer calculates the charges to the user at step 108. In response to the payment by the user, the rental facility computer prints a receipt in step 109, and the rental process ends.

Although only a preferred embodiment is specifically illustrated and described herein, it will be appreciated that many modifications and variations of the present invention are possible in light of the above teachings and within the purview of the appended claims without departing the spirit and intended scope of the invention.

What is claimed is:

1. A method for managing a fleet of rental vehicles, comprising the steps of:
   providing a radio transmitter connected to a vehicle navigation system in each rental vehicle;
   providing a radio transmitter connected to a rental facility computer in a rental vehicle facility;
   receiving information from a user and establishing a rental term which is stored in the rental facility computer;
   verifying user information when the user arrives at the rental vehicle facility;
   exchanging data by sending the rental term and user information from the rental facility computer to the vehicle navigation system through the radio transmitters and sending current vehicle condition information including milage and gas level from the vehicle navigation system to the rental facility computer;
   starting a rental period of the rental vehicle after the step of exchanging the data;
   monitoring usage of the rental vehicle and storing data relating to the usage of the rental vehicle in a memory provided in the vehicle navigation system;
   sending the data relating to the usage of the rental vehicle to the rental facility computer through the radio transmitters for calculating a rental fee; and
   returning the rental vehicle by confirming the data relating to the usage of the rental vehicle and paying the rental fee by the user.

2. A method for managing a fleet of rental vehicles as defined in claim 1, wherein the step of monitoring the usage of the vehicle comprises the steps of:
   determining a distance traveled by the vehicle since the start of the rental and recording data relating to the distance in the memory in the vehicle navigation system; and
   determining if an accident has occurred and recording data relating to the accident in the memory in the vehicle navigation system.

3. A method for managing a fleet of rental vehicles as defined in claim 2, wherein the step of recording data relating to the accident includes a step of recording data concerning a location, time, and destination in the memory in the vehicle navigation system.

4. A method for managing a fleet of rental vehicles as defined in claim 2, wherein the step of recording data relating to the accident includes the steps of detecting a signal from an air bag sensor indicating a deployment of air bags in the rental vehicle and recording data concerning a location, time, and destination in the memory in the vehicle navigation system.

5. A method for managing a fleet of rental vehicles as defined in claim 4, wherein the step of determining the condition of the vehicle includes the steps of:
   determining an amount of fuel consumed in the rental vehicle during the rental period;
   determining a distance traveled by the rental vehicle during the rental period; and
   determining whether the rental vehicle requires service as a result of the rental.

6. A method for managing a fleet of rental vehicles as defined in claim 1, wherein the rental vehicle is provided with a Bluetooth transceiver using a 2.45 GHz frequency band and a Bluetooth enabled telephone.

7. A method for managing a fleet of rental vehicles as defined in claim 1, wherein the radio transmitter in the rental vehicle or in the rental vehicle facility is a wireless transceiver based on Bluetooth standard.

8. A method for managing a fleet of rental vehicles as defined in claim 1, wherein the radio transmitter in the rental vehicle or in the rental vehicle facility is a wireless transceiver based on IEEE 802.11b standard.

9. A method for managing a fleet of rental vehicles as defined in claim 1, wherein the radio transmitter in the rental vehicle or in the rental vehicle facility is a wireless transceiver based on HomeRF standard.

10. A method for managing a fleet of rental vehicles as defined in claim 1 further comprising the steps of:
    determining condition of the rental vehicle when the rental vehicle is returned to the rental vehicle facility based on the data relating to the usage of the rental vehicle received by the rental facility computer and based on visual inspection; and
    transmitting the condition of the rental vehicle to the vehicle navigation system through the radio transmitters for confirmation by the user.

11. A rental vehicle management system, comprising:
    a vehicle radio transmitter connected to a vehicle navigation system in each rental vehicle;
    a station radio transmitter connected to a rental facility computer in a rental vehicle facility;
    means for receiving information from a user and establishing a rental term which is stored in the rental facility computer and verifying user information when the user arrives at the rental vehicle facility;
    means for exchanging data by sending the rental term and user information from the rental facility computer to the vehicle navigation system through the radio transmitters and sending current vehicle condition information including milage and gas level from the vehicle navigation system to the rental facility computer through the radio transmitters;
    wherein the vehicle navigation system monitors usage of the rental vehicle and stores data relating to the usage of the rental vehicle in a memory and sends the stored data to the rental facility computer through the radio transmitters for calculating a rental fee, thereby returning the rental vehicle by confirming the usage of the rental vehicle and paying the rental fee by the user.

12. A rental vehicle management system as defined in claim 11, wherein the rental vehicle is provided with a Bluetooth transceiver using a 2.45 GHz frequency band and a mobile telephone enabled with Bluetooth protocol.

13. A rental vehicle management system as defined in claim 11, wherein the vehicle navigation system determines a distance traveled by the rental vehicle and records data relating to the distance in the memory in the vehicle navigation system; and determines if an accident has occurred and records data relating to the accident in the memory in the vehicle navigation system.

14. A rental vehicle management system as defined in claim 13, wherein the data relating to the accident to be stored in the vehicle navigation system includes data concerning a location and time of the accident and destination of the rental vehicle before the accident.

15. A rental vehicle management system as defined in claim 13, wherein the vehicle navigation system detects a signal from an air bag sensor indicating a deployment of air bags in the rental vehicle and records the data concerning a location and time of the accident and destination of the rental vehicle before the accident.

16. A rental vehicle management system as defined in claim 11, wherein the radio transmitter in the rental vehicle or in the rental vehicle facility is a wireless transceiver based on Bluetooth standard.

17. A rental vehicle management system as defined in claim 11, wherein the radio transmitter in the rental vehicle or in the rental vehicle facility is a wireless transceiver based on IEEE 802.11b standard.

18. A rental vehicle management system as defined in claim 11, wherein the radio transmitter in the rental vehicle or in the rental vehicle facility is a wireless transceiver based on Home RF standard.

* * * * *